(12) United States Patent
Li (10) Patent No.: US 12,140,803 B2
(45) Date of Patent: Nov. 12, 2024

(54) EASY-TO-ASSEMBLE SC CONNECTOR

(71) Applicant: Huizhou Fibercan Industrial Co.,Ltd, Huizhou (CN)

(72) Inventor: Yaole Li, Huizhou (CN)

(73) Assignee: Huizhou Fibercan Industrial Co., Ltd, Huizhou (CN)

( * ) Notice: Subject to any disclaimer, the term of this patent is extended or adjusted under 35 U.S.C. 154(b) by 375 days.

(21) Appl. No.: 17/844,151

(22) Filed: Jun. 20, 2022

(65) Prior Publication Data
US 2023/0393349 A1    Dec. 7, 2023

(30) Foreign Application Priority Data
Jun. 2, 2022 (CN) .......................... 202221364836.6

(51) Int. Cl.
*G02B 6/38* (2006.01)
*G02B 6/36* (2006.01)

(52) U.S. Cl.
CPC ......... *G02B 6/3833* (2013.01); *G02B 6/3696* (2013.01); *G02B 6/3825* (2013.01); *G02B 6/3873* (2013.01)

(58) Field of Classification Search
None
See application file for complete search history.

(56) References Cited

U.S. PATENT DOCUMENTS

| | | | |
|---|---|---|---|
| 8,931,963 B2 * | 1/2015 | Scopic | G02B 6/3851 385/139 |
| 2017/0343745 A1 * | 11/2017 | Rosson | G02B 6/3821 |
| 2020/0018907 A1 * | 1/2020 | Li | G02B 6/3857 |

* cited by examiner

*Primary Examiner* — Jerry Rahll
(74) *Attorney, Agent, or Firm* — Birchwood IP (57) ABSTRACT

An easily assembled SC connector, comprising a tail sleeve, an outer frame sleeve, a fixing piece, a limiting piece, a tail pipe, a stop ring, a press-inserting core tail shank, a spring, a metal ring, a ceramic inserting core, and a dustproof cap. During assembling, the tail pipe is sleeved in the tail sleeve in an interference fit, then the metal ring is fixedly connected to the press-inserting core tail shank by means of injection molding, and the stop ring and the limiting piece are fixed by means of injection molding. The injection molding has a simple production process and low costs. The whole assembly process is simple, and automatic assembly can be achieved. In addition, the present application only needs to directly extend a needle for dispensing glue into the center of the press-inserting core tail shank.

9 Claims, 10 Drawing Sheets

EASY-TO-ASSEMBLE SC CONNECTOR

CROSS-REFERENCE TO RELATED APPLICATIONS

This is a U.S. patent application which claims the priority and benefit of Chinese Patent Application Number 202221364836.6, filed on Jun. 2, 2022, the disclosure of which is incorporated herein by reference in its entirety.

TECHNICAL FIELD

The present application relates to an easy-to-assemble SC connector.

BACKGROUND

With the increasing demand of people for communication bandwidth, optical fibers have been widely used in wired communication networks. The SC connector is a device for detachably (movably) connecting between optical fibers, and accurately interconnects two end faces of the optical fiber, to maximize the coupling of the optical energy output from the transmitting fiber into the receiving fiber and minimize the impact on the system due to its intervening optical links. At present, SC connectors on the market are complex in structure and have a large number of parts, and the material selection and forming method of some parts lead to high costs, and are not convenient for automated assembly, leading to high overall costs, and meanwhile, data transmission is not stable enough.

SUMMARY

In order to overcome the shortcomings of the prior art, the present application provides an easy-to-assemble SC connector.

The technical solution adopted by the present application to solve the technical problem thereof is: an easy-to-assemble SC connector, comprising a tail sleeve, an outer frame sleeve, a fixing piece fixed to the outer frame sleeve, a limiting piece snap-fitted with the fixing piece, a tail pipe sleeved in the tail sleeve, a stop ring fixedly connected to the limiting piece, a press-inserting core tail shank which is arranged in the fixing piece and the tail thereof extends to the inside of the stop ring, a spring defined between the press-inserting core tail shank and the stop ring, and a metal ring fixed in the press-inserting core tail shank, a ceramic inserting core fixedly sleeved in a metal ring in an interference fit, and the press-inserting core tail shank abuts against the stop ring via the spring.

In a further technical solution, the material used for the press-inserting core tail shank is plastic that can be molded by means of injection molding, and the limiting piece is fixedly connected to the stop ring by means of injection molding, and the metal ring is fixedly connected to the press-inserting core tail shank by means of injection molding.

In a further technical solution, the limiting piece comprises a first square block and a second square block which is fixedly connected to an upper end of the first square block in an overlapping manner, wherein a first circular hole penetrating through the first square block and extending into the middle of the second square block, and a second circular hole concentric with the first circular hole and connected to the top thereof are provided at the center of the limiting piece; the first square block is concentric with the second square block, and the first square block is larger than the second square block, a first step is formed on the outer sides of the first square block and the second square block, and after the fixing piece and the second square block are buckled, the bottom of the fixing piece is located on the upper side of the first step, the outer side of the first square block is provided with a process notch, and the outer side of the second square block is further provided with a snap-fit fastener I for snap-fit the fixing piece, the diameter of the second circular hole is greater than the diameter of the first circular hole, and a second step is formed at the junction of the first circular hole and the second circular hole, the inner wall of the first circular hole is provided with a plurality of protruding annular limiting projections I arranged at intervals.

In a further technical solution, the stop ring is provided with a cylinder I with a through hole I at center, the outer wall of the cylinder I is provided with annular limiting grooves I and annular protruding rings III arranged at equal intervals, an upper portion of the cylinder I enters the first circular hole and a top surface of the cylinder I is flush with the second step, the annular limiting groove I of the part of the outer wall of the cylinder I entering the first circular hole corresponds to the annular limiting protrusion I, the lower part of the cylinder I extends into the tail pipe and is fixedly connected to the tail pipe in an interference fit.

In a further technical solution, the fixing piece is provided with a cuboid-shaped block I, two sides of the cuboid-shaped block I are provided with a snap-fit window I corresponding to the first snap-fit fastener I, and a snap-fit fastener II snap-fitted with the outer frame sleeve, U-shaped openings in communication with the bottom are provided on the other two sides of the cuboid-shaped block I, and a square hole is provided at one end of the cuboid-shaped block I close to the U-shaped opening, the other end of the cuboid-shaped block I is provided with a cylindrical hole I in communication with the square hole, and an annular flange structure protruding towards the center is provided between the cylindrical hole I and the square hole, the annular flange structure is provided with an inner hole I in communication with the cylindrical hole I and the square hole, and the length of the snap-fit window I is less than twice the width, the width of the U-shaped opening is less than half of the width of the first button window.

In a further technical solution, the wall thickness of the cuboid-shaped block I located at two sides of the snap-fit fastener II is greater than the wall thickness of the other two sides, the length and width of the snap-fit window I are respectively set to 2.5 cm and 1.4 cm, and the width of the opening of the U-shaped opening is set to less than 0.80 cm.

In a further technical solution, a wedge-shaped groove is provided at the upper part of the cuboid-shaped block I on one side of the snap-fit fastener II, and the bottom of the wedge-shaped groove is at a certain distance from the other side edge of the cuboid-shaped block I to form a reinforcing rib.

In a further technical solution, the press-inserting core tail shank is provided with a cuboid III, a cylinder IV concentrically stacked and fixedly connected to the lower end of the cuboid III, and a cylinder V concentrically stacked and fixedly connected to the lower end of the cylinder IV, a cylindrical hole II is provided at the center of the cylinder V, a cylindrical hole III overlapped and connected to the upper end of the cylindrical hole II and penetrating through the cylinder IV, and a cylindrical hole IV is provided at the center of the cuboid III, wherein the cylindrical hole II, the cylindrical hole III and the cylindrical hole IV are concentric with the cuboid III, the cylinder IV and the cylinder V, and the cylindrical hole III is in communication with the cylindrical hole IV, and the bottom opening of the cylindrical hole II is provided with a chamfer I, a chamfer II is provided between the cylindrical hole II and the cylindrical hole III, a chamfer IV is provided between the cylindrical hole III and the cylindrical hole IV, the metal ring is defined in the cuboid III, the cuboid III is arranged in the square hole, and the top of the cuboid III abuts against the bottom of the annular flange structure, the cylinder V extends out of the square hole and extends into the through hole I of the stop ring at a certain distance, a distance is between the bottom of the cuboid III and the top of the second step, and the spring is defined between the bottom of the cuboid III and the top surface of the cylinder I and the second step.

In a further technical solution, the metal ring is provided with an inner hole II, an outer wall of the metal ring is provided with a protruding annular limiting groove II, and the metal ring is fixedly connected in a cylindrical hole IV of the cuboid III by means of injection molding, the top of the metal ring is flush with the top of the cuboid III, an inner wall of the cylindrical hole IV is provided with an annular limiting projection II corresponding to the annular limiting groove II, the inner hole II of the metal ring is concentrically aligned with the cylindrical hole III and the inner hole I, and the inserting core passes through the cylindrical hole I and the inner hole I to enter the inner hole II.

The beneficial effect of the present application is to provide an easy-to-assemble SC connector, comprising a tail sleeve, an outer frame sleeve, a fixing piece, a limiting piece, a tail pipe, a stop ring, a press-inserting core tail shank, a spring, a metal ring, a ceramic inserting core and a dustproof cap. During assembling, the tail pipe is sleeved in the tail sleeve in an interference fit, the metal ring is fixedly connected to the press-inserting core tail shank by means of an injection molding, and the stop ring and the limiting piece are fixed by means injection molding. The injection molding has a simple production process and low costs. The inserting core is inserted into the metal ring, and the spring is arranged between the press-inserting core tail shank and the stop ring, and then the fixing piece is sleeved outside the stop piece and snap-fitted with the limiting piece to form a fixedly connection with the limiting piece. After the optical cable core extends into the press-insetting core tail shank, glue is dispensed to fix the optical cable core with the press-inserting core tail shank, the inserting core and metal ring, and then the stop ring is fixedly connected to the tail pipe in an interference fit, then the outer frame is sleeved on the outer side of the fixing piece and is fixedly connected to the fixing piece in a snap-fit manner, and after that, the assembly can be completed by inserting the dustproof cap between the inserting core and the fixing piece. The assembly process is simple, and automatic assembly can be achieved. In addition, the present application only needs to directly extend a needle for dispensing glue into the center of the press-inserting core tail shank. Compared with the prior art, not only one part is saved, the structure is simple, the installation steps are saved, and the costs are saved. The cuboid III of the press-inserting core tail shank is defined in a square hole of the outer frame sleeve. Since the two are both of a square structure, the movable space of the cuboid III in the square hole is small, and the cuboid III can be stably defined in the square hole, so that data transmission is more stable.

The present application has a simple structure and fewer parts, is convenient for automated assembly, and has a stable data connection and a low cost.

DETAILED DESCRIPTION

Embodiments of the present application will be described below in conjunction with the accompanying drawings and related embodiments. The embodiments of the present application are not limited to the following embodiments. The present application relates to relevant essential components in the technical field, and should be considered as a known technology in the technical field, which can be known and grasped by those skilled in the technical field.

With reference to FIGS. 1 to 10, the present application is realized as follows: an easy-to-assemble SC connector, comprising a tail sleeve 1, an outer frame sleeve 2, a fixing piece 3 fixed to the outer frame sleeve 2, a limiting piece 5 snap-fitted with the fixing piece 3, a tail pipe 6 sleeved in the tail sleeve 1, a stop ring 7 fixedly connected to the limiting piece 5, a press-inserting core tail shank 8 which is set in the fixing piece 3 and the tail thereof extends to the inside of the stop ring 7, a spring 9 defined between the press-inserting core tail shank 8 and the stop ring 7, a metal ring 10 fixed in the press-inserting core tail shank 8, a ceramic inserting core 11 fixedly sleeved in the metal ring 10 in an interference fit, and a dustproof cap. The press-inserting core tail shank 8 is configured to abut against the stop ring 7 by means of a spring 9.

Figure 1:
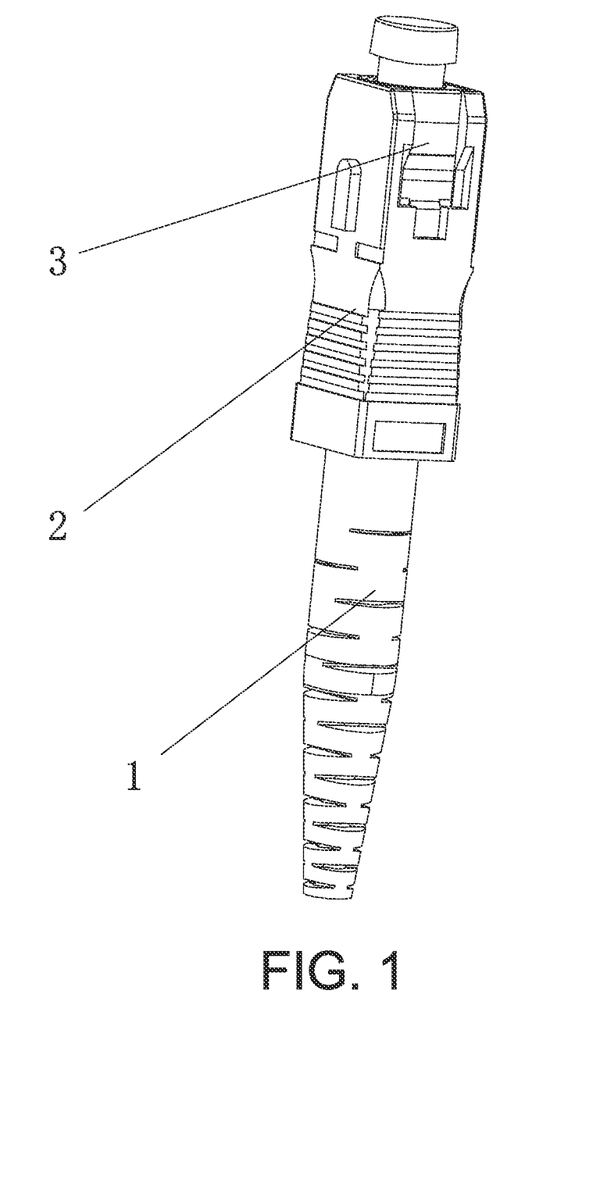
FIG. 1 is a structural schematic diagram of an easy-to-assemble SC connector according to an embodiment of the present application.
Figure 2:
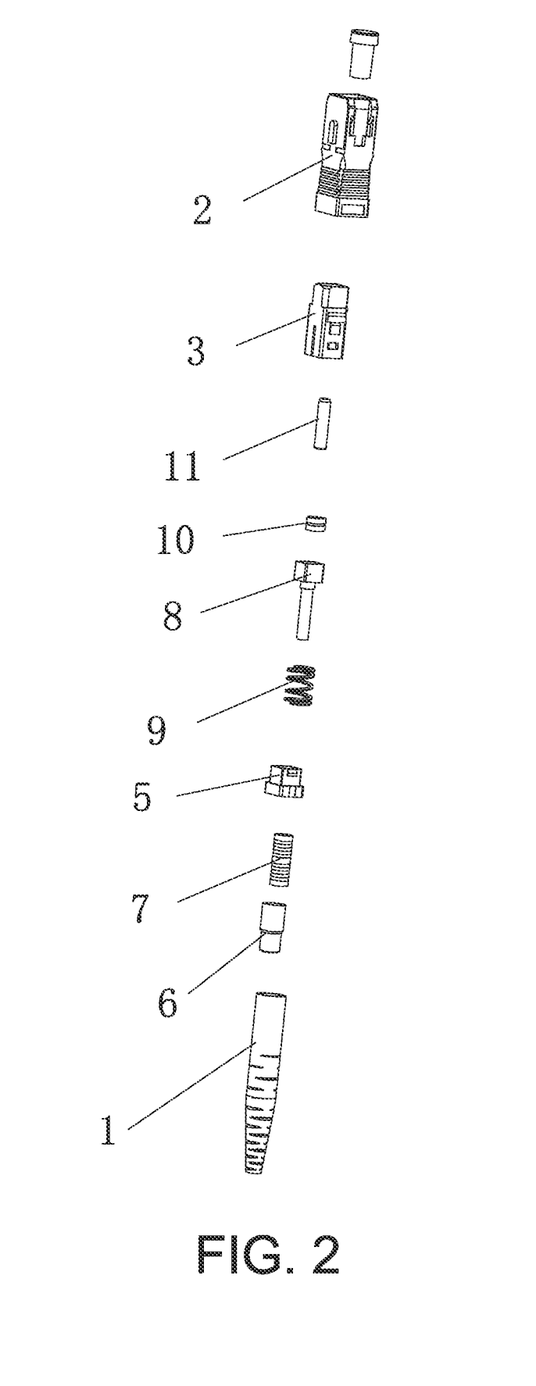
FIG. 2 is an exploded structure diagram of an easy-to-assemble SC connector according to the present application.
Figure 3:
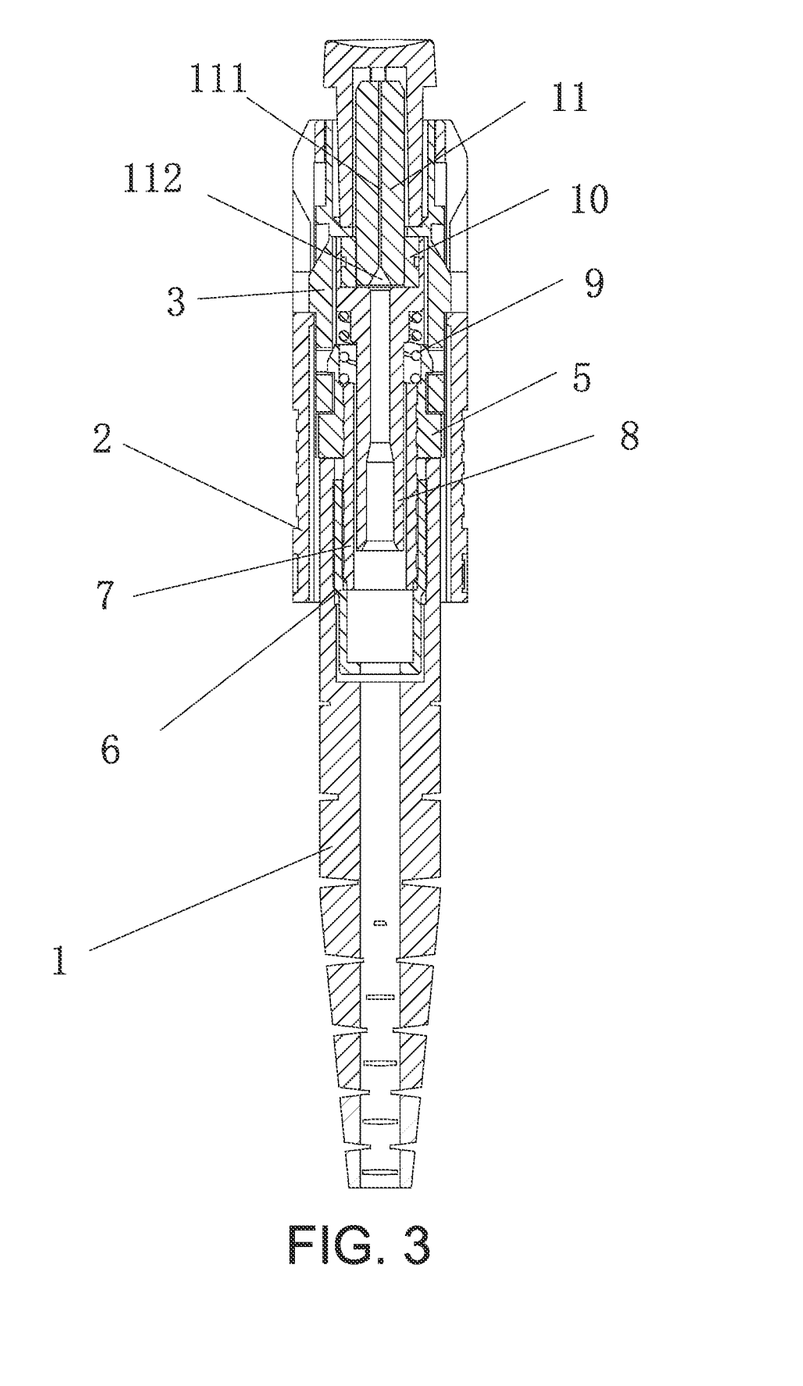
FIG. 3 is a schematic diagram of an intermediate cross-sectional structure of an easy-to-assemble SC connector according to the present application.

When assembling, the tail pipe 6 is sleeved in the tail sleeve 1 in an interference fit, and then the metal ring 10 is fixedly connected to the press-inserting core tail shank, inserting the inserting core 11 into the metal ring 10, fixing the limiting piece 7 with the limiting piece 5, and placing the spring 9 between the press-inserting core tail shank 8 and the stop ring 7, then the fixing piece 3 is sleeved outside the limiting piece 5 and is snap-fitted the limiting piece 5 to form a fixedly connection with the limiting piece, and after the optical cable core extends into the press-inserting core tail shank 8, glue is dispensed to fix the optical cable core with the press-inserting core tail shank 8, the inserting core 11 and the metal ring 10, and then the stop ring 7 is fixedly connected to the tail pipe 6 in an interference fit. Then, the outer frame sleeve 2 is sleeved on the outer side of the fixing piece 3 and is fixedly connected to the fixing piece 3 in a snap-fitted manner, and the assembly can be completed by inserting the dustproof cap between the inserting core 11 and the fixing piece 3. The entire assembly process can be accomplished by automated assembly.

Figure 8:
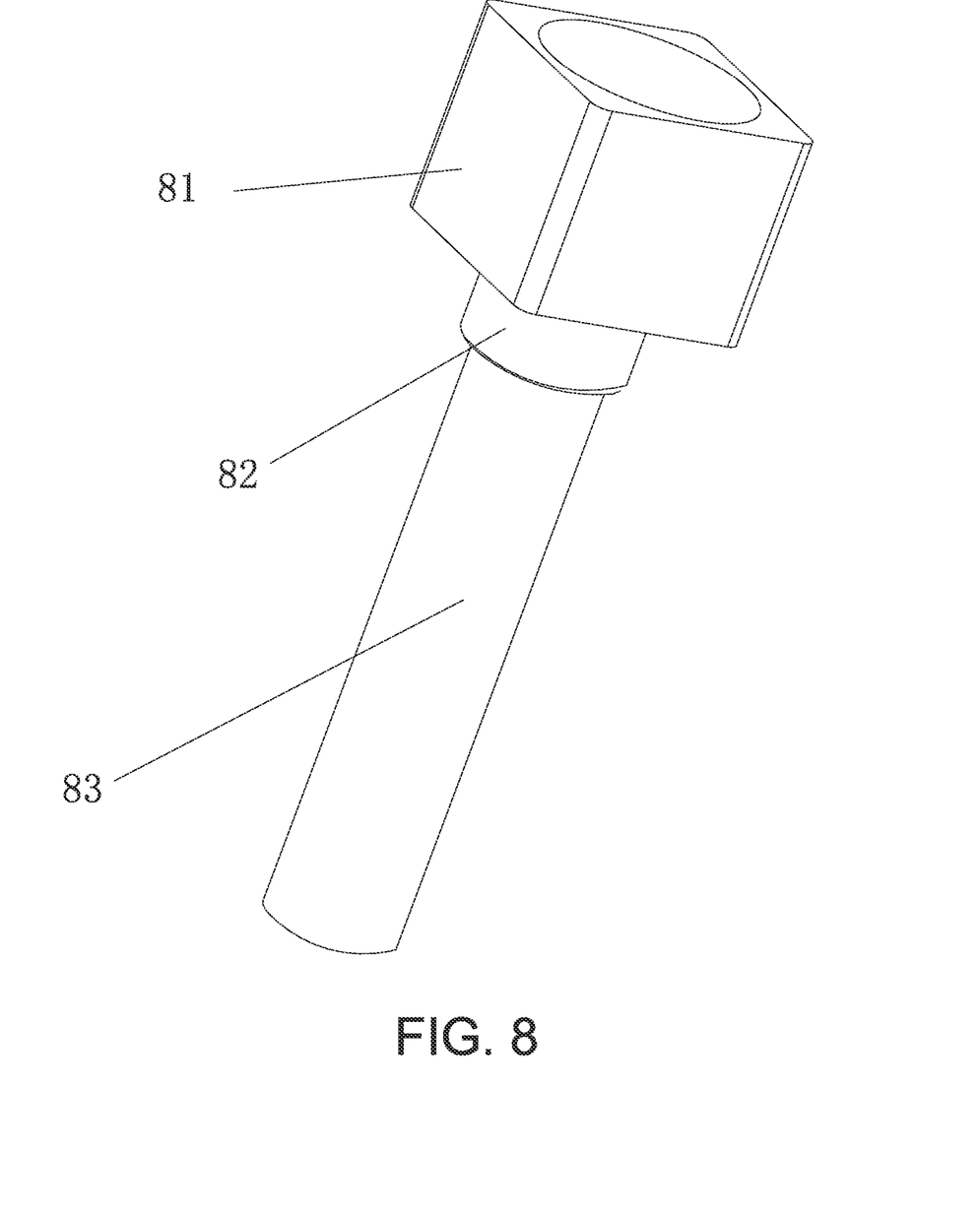
FIG. 8 is a structural schematic diagram of the press-inserting core tail shank of an easy-to-assemble SC connector according to the present application.
Figure 9:
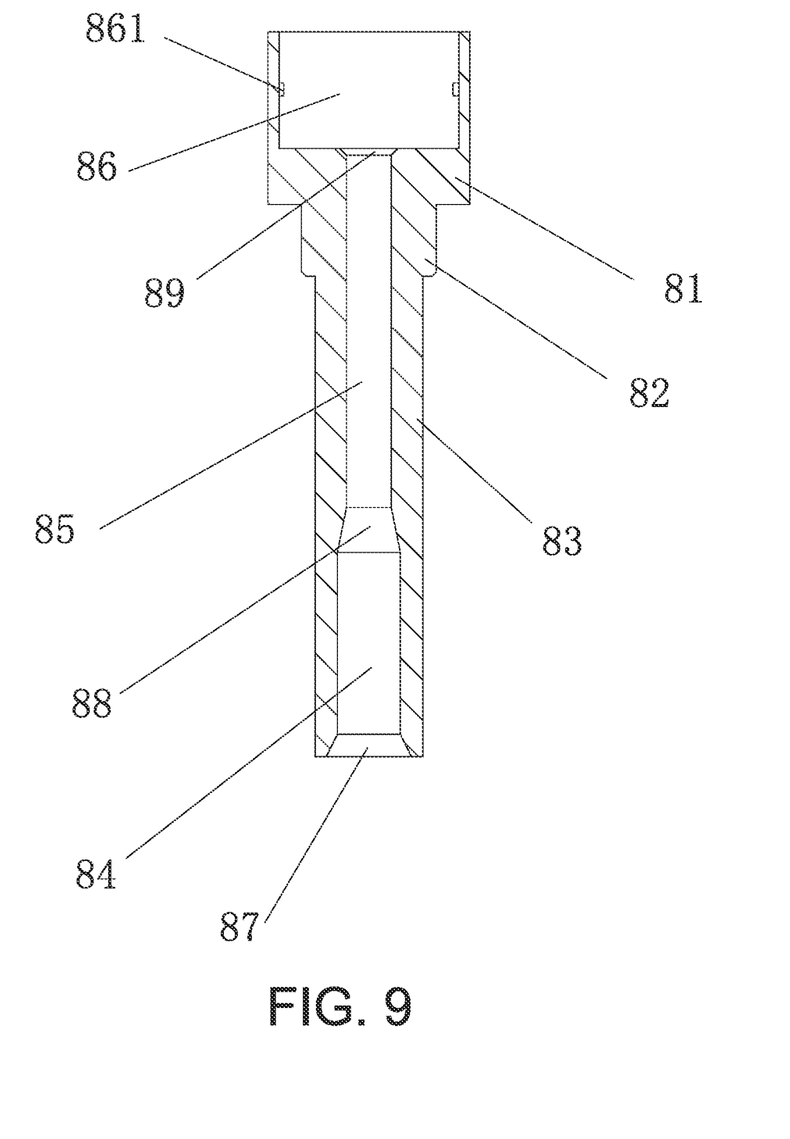
FIG. 9 is a structure diagram of a middle sectional structure of the press-inserting core tail shank of an easy-to-assemble SC connector according to the present application.

At present, a metal material used in the press-inserting core tail shank 8 in the market needs to be formed by machining in a die-casting or machining molding manner. In the present application, a plastic that can be molded in an injection molding manner is selected as the material used for the press-inserting core tail shank 8, thereby saving material costs and production costs.

Currently, for a connector of an SC connector in the market, in order to facilitate glue dispensing by a needle and prevent the glue from overflowing and flowing back, a transparent pipe needs to be added to the tail of the press-inserting core tail shank 8. In the present application, glue can be dispensed only by directly extending a needle for glue dispensing into the center of the press-inserting core tail shank 8, thereby saving a part, saving an installation step, and saving costs.

In the present application, the structure and connection manner of the tail pipe 6 and the tail sleeve 1, and the glue dispensing after the optical cable enters the inserting core 11 through the tail pipe 6 are well-known technologies in the industry, and are not described herein again.

Figure 10:
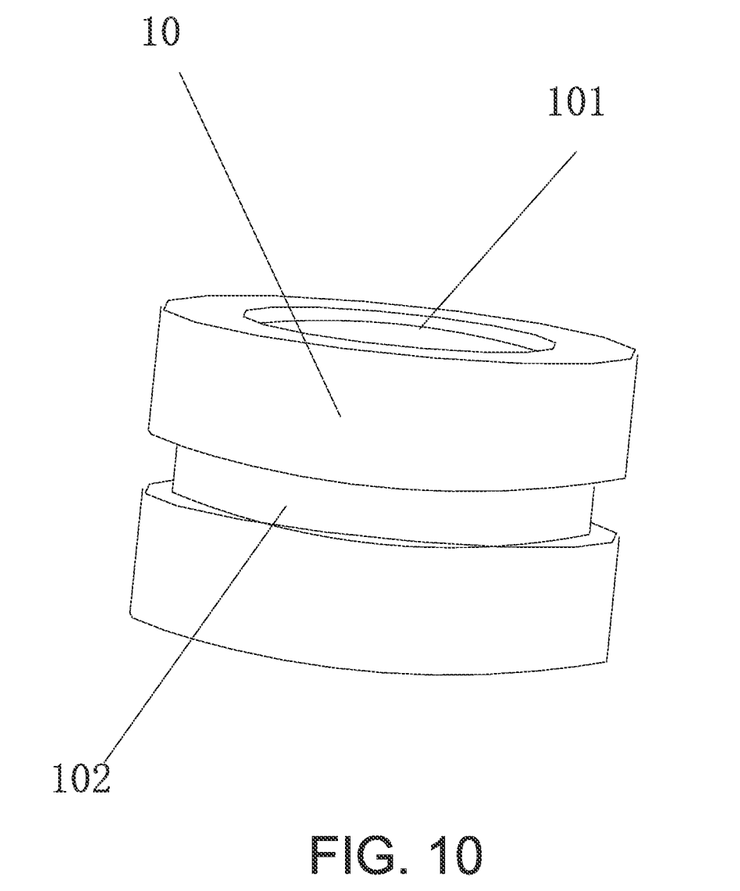
FIG. 10 is a structure diagram of the metal ring of an easy-to-assemble SC connector according to the present application.

On the basis of the above embodiments, as a further preference, the material used for the press-inserting core tail shank 8 is plastic that can be molded by means of injection molding, and the limiting piece 5 is fixedly connected to the stop ring 7 by means of injection molding, and the metal ring 10 is fixedly connected to the press-inserting core tail shank 8 by means of injection molding.

Furthermore, for a connector of a currently available SC connector, the press-inserting core tail shank 8 is made of a metal material and is formed by means of forging or machining, thereby having a high production cost. The press-inserting core tail shank 8 8 of the present application is injection-molded in an injection molding manner, and the limiting piece 5, the stop ring 7, the metal ring 10 and the press-inserting core tail shank 8 8 are fixed in an injection molding manner, so that not only a fixed connection is stable, but also production costs are low.

Figure 4:
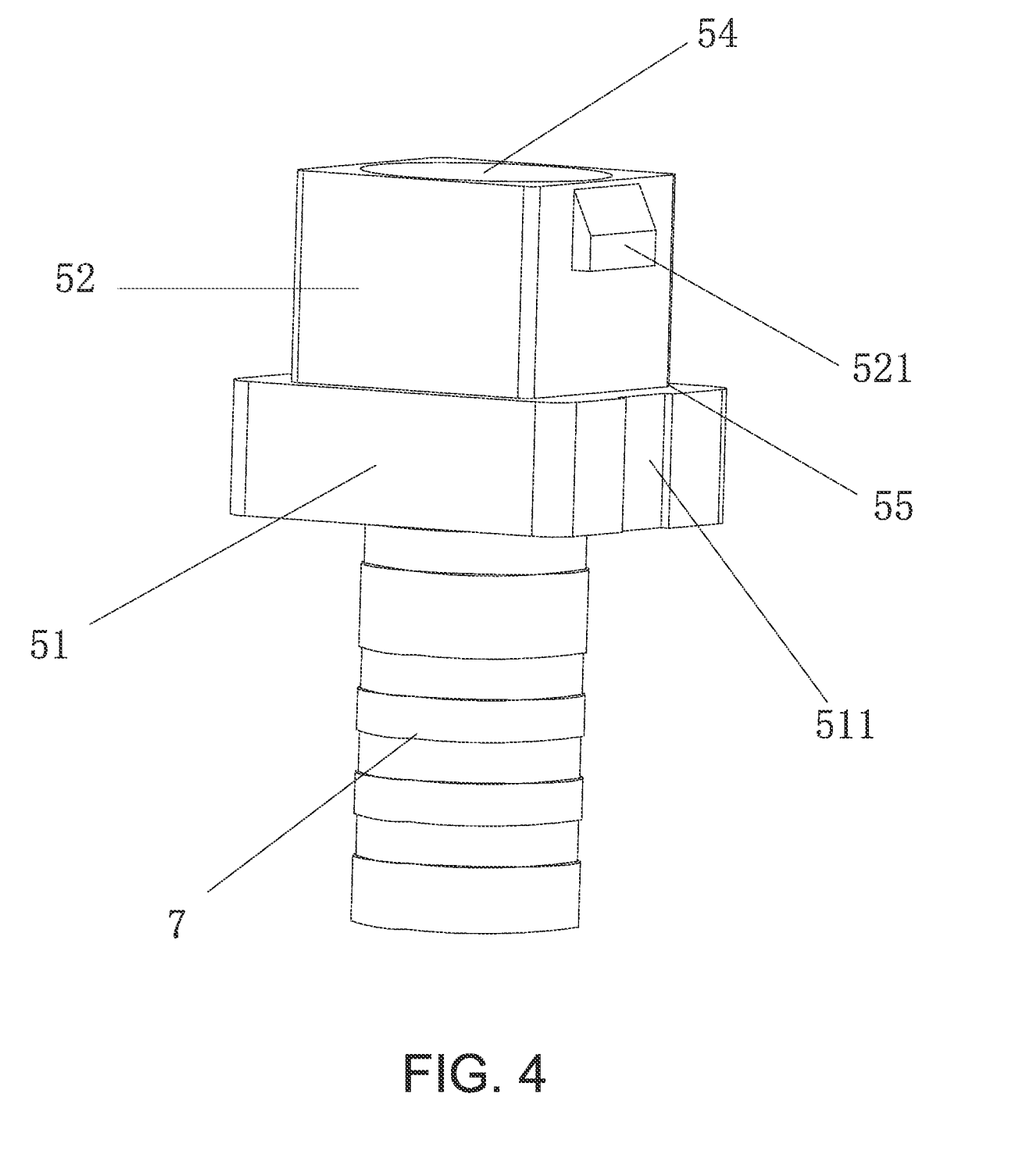
FIG. 4 is a structural schematic diagram of an easy-to-assemble SC connecting limiting piece and stop ring of the present application.
Figure 5:
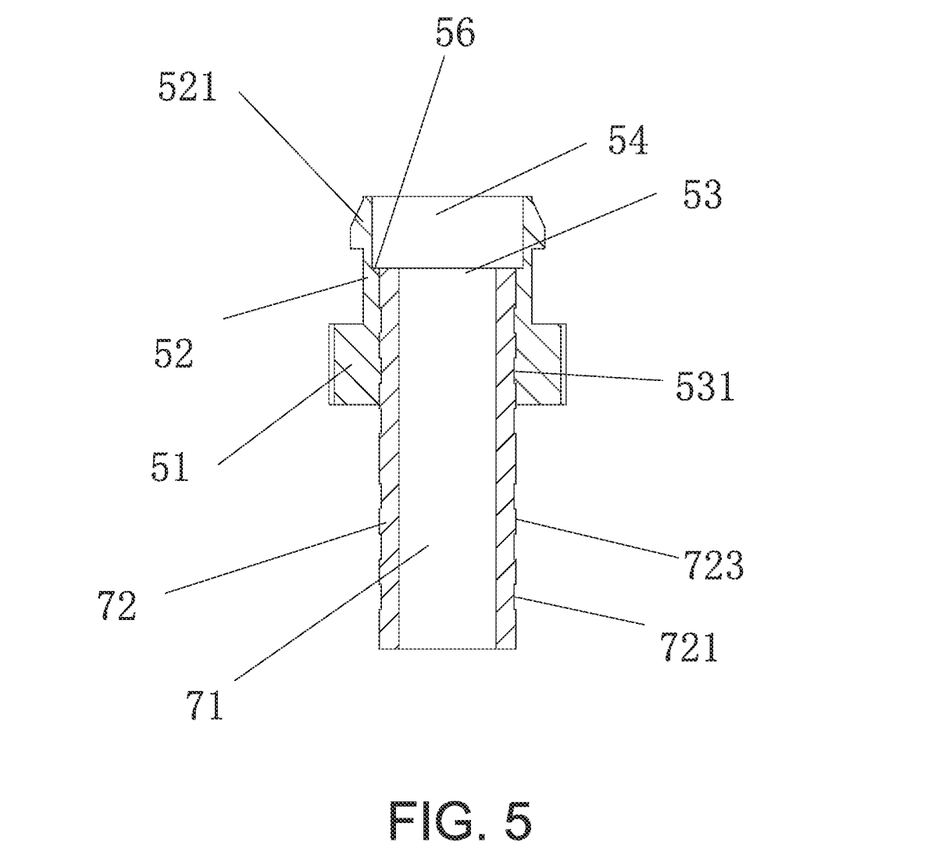
FIG. 5 is a schematic structural middle sectional view of FIG. 4 of an easy-to-assemble SC connector according to the present application.

On the basis of the described embodiment, as a further preference, the limiting piece 5 comprises a first square block 51 and a second square block 52 which is fixedly connected to an upper end of the first square block 51 in an overlapping manner, wherein a first circular hole 53 penetrating through the first square block 51 and extending into the middle of the second square block, and a second circular hole 54 concentric with the first circular hole 53 and connected to the top thereof are provided at the center of the limiting piece 5; the first square block 51 is concentric with the second square block 52, and the first square block 51 is larger than the second square block 52, a first step 55 is formed on the outer sides of the first square block 51 and the second square block 52, and after the fixing piece 3 and the second square block 52 are buckled, the bottom of the fixing piece is located on the upper side of the first step 55, the outer side of the first square block 51 is provided with a process notch 511, and the outer side of the second square block 52 is further provided with a snap-fit fastener I 521 for snap-fit the fixing piece 3, the diameter of the second circular hole 54 is greater than the diameter of the first circular hole 53, and a second step 56 is formed at the junction of the first circular hole 53 and the second circular hole 54, the inner wall of the first circular hole 53 is provided with a plurality of protruding annular limiting projections I 531 arranged at intervals.

The lower end of the first square block 51 abuts against the top face of the tail sleeve 1, thereby defining the relative position of the tail sleeve 1 and the fixing piece 3. The second square block 52 extends into the fixing piece 3, the snap-fit fastener I 521 is snap-fitted with the fixing piece 3, and the bottom of the fixing piece 3 is arranged on the upper side of the first step 55, thereby defining the relative position of the limiting piece 5 and the fixing piece 3. The first square block 51 is defined in the outer frame sleeve 2, and also defines the relative position of the limiting piece 5 in the square inner hole of the outer frame sleeve 2. Since both the first square blocks 51 and the square inner holes in the outer frame sleeve 2 are of a square structure, the movable space of the first square blocks 51 in the square inner holes in the frame sleeve 2 is small, and the first square blocks 51 can be stably defined in the square inner holes in the frame sleeve 2.

The upper part of the stop ring 7 extends into the first circular hole 53, and the top of the stop ring 7 is flush with the second step 56. The arrangement of the annular limiting projection I 531 facilitates fixing the stop ring 7 in the first circular hole 53 by means of injection molding, and increases the holding force between the stop ring 7 and the limiting piece 5.

The limiting block is provided with a process notch 511, which facilitates the automatic device to be gripped when being installed, so that automatic machine assembly can be performed, thereby accelerating assembly efficiency and reducing production costs, On the basis of the above embodiment, as a further preference, the stop ring 7 is provided with a cylinder I 72 with a through hole I 71 in the center, the outer wall of cylinder I 72 is provided with annular limiting grooves I 721 and annular protruding rings III 723 which are arranged at equal intervals. An upper portion of the cylinder I 72 enters the first circular hole 53 and a top surface of the cylinder I 72 is flush with the second step 56. The annular limiting groove I 721 of the part of the outer wall of the cylinder I 72 entering the first circular hole 53 corresponds to the annular limiting protrusion I 531. A lower portion of the cylindrical I 72 extends into the tail pipe 6 and is fixedly connected to the tail pipe 6 in an interference fit.

The upper portion of the stop ring 7 is fixedly connected together with the first circular hole 53 of the limiting piece 5 by means of injection molding, and the stop ring 7 and the limiting piece are fixed by means of injection molding more stably by means of the mutual engagement of the annular limiting groove I 721 and the annular limiting protrusion I 531, The annular protruding ring III 723 at the lower part of the cylinder I 72 makes the stop ring 7 and the tail pipe 6 more easily assembled in an interference fit without affecting the stability of a fixed connection in an interference fit.

Figure 6:
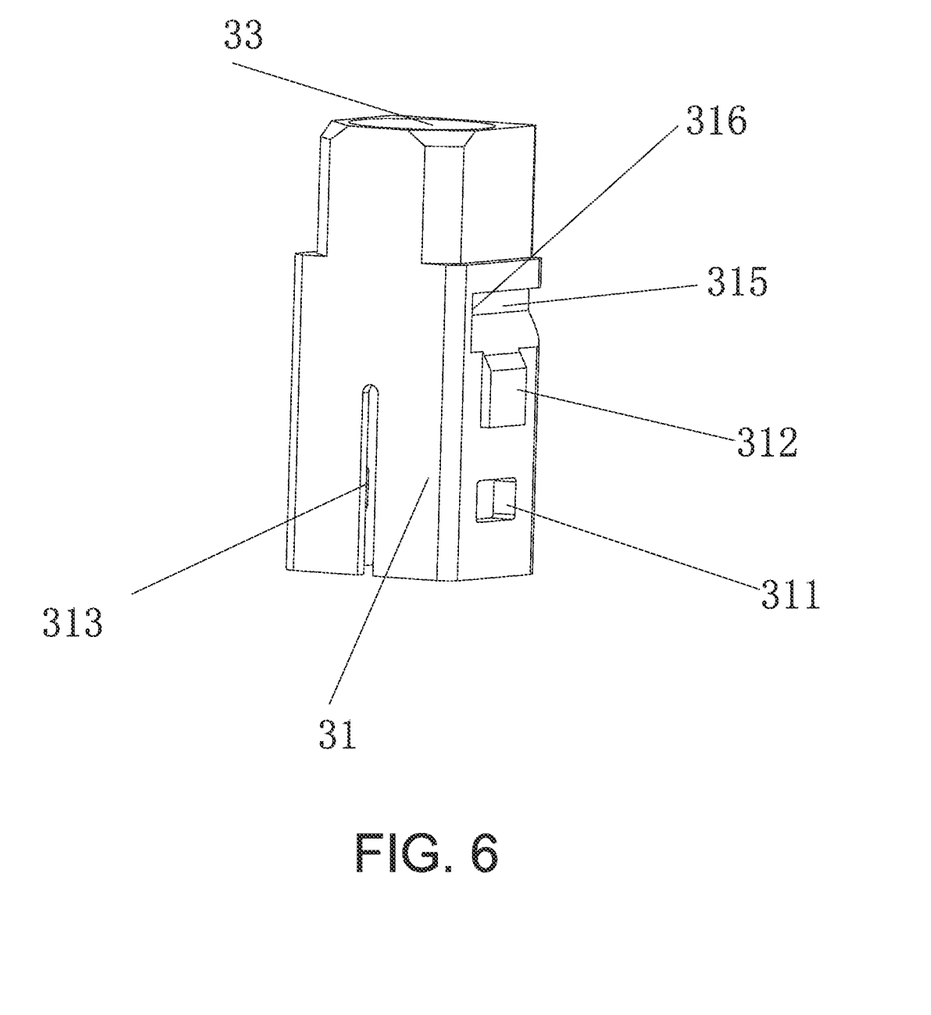
FIG. 6 is a structure diagram of the fixing piece of an easy-to-assemble SC connector according to the present application.
Figure 7:
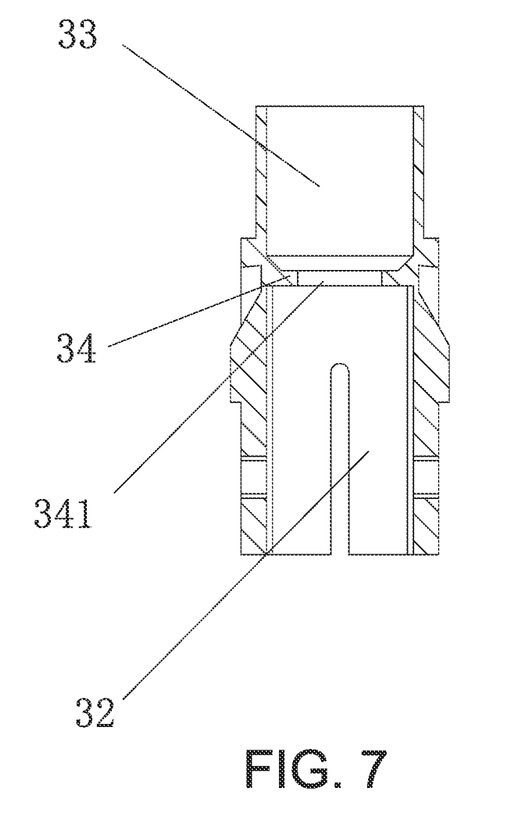
FIG. 7 is a schematic diagram of a middle sectional structure of the fixing piece of an easy-to-assemble SC connector according to the present application.

On the basis of the above embodiment, as a further preference, the fixing piece 3 is provided with a cuboid-shaped block I 31, two sides of the cuboid-shaped block I 31 are provided with a snap-fit window I 311 corresponding to the first snap-fit fastener I 521, and a snap-fit fastener II 312 snap-fitted with the outer frame sleeve 2, U-shaped openings 313 in communication with the bottom are provided on the other two sides of the cuboid-shaped block I 31, and a square hole 32 is provided at one end of the cuboid-shaped block I 31 close to the U-shaped opening 313, the other end of the cuboid-shaped block I 31 is provided with a cylindrical hole I 33 in communication with the square hole 32, and an annular flange structure 34 protruding towards the center is provided between the cylindrical hole I 33 and the square hole 32, the annular flange structure 34 is provided with an inner hole I 341 in communication with the cylindrical hole I 33 and the square hole 32.

The second square block 52 of the limiting piece 5 enters the square hole 32 from the opening at the lower end of the fixing piece 3. The two components are of a quadrilateral structure. The movable space of the second square block 52 in the square hole 32 is small, so that the second square block 52 of the limiting piece 5 can be stably confined in the square hole 32, and data transmission is more stable. After the snap-fit fastener I 521 is snap-fitted with the snap-fit window I 311, the bottom of the cuboid-shaped block I 31 is located on the upper side of the first step 55 and can define the position of the square block I. The inserting core 11 enters the metal ring 10 through the inner hole I 341 through the cylindrical hole 133. When the snap-fit fastener I 521 is snap-fitted with the snap-fit window I 311 and the snap-fit fastener II 312 is snap-fitted with the outer frame sleeve 2, the side wall of the square block slightly expands due to snap-fit. The design of the U-shaped opening 313 provides a buffer space for expansion. The length of the snap-fit window I 311 is less than twice the width of the snap-fit window I 311, and the width of the U-shaped opening 313 is less than half of the width of the snap-fit window I 311, not only can ensure that the snap-fit fastener I 521 and the snap-fit window I 311 can be snap-fitted stably, but also can ensure that the side wall of the cuboid-shaped block I 31 does not need to be greatly expanded when the snap-fit fastener I 521 and the snap-fit window I 311 are snap-fitted, Therefore, if the width of the U-shaped opening 313 is half of the width of the snap-fit window I 311, it can be avoided that the side wall of the cuboid-shaped block I 31 is not strong enough to break because the width of the U-shaped opening 313 is too large.

On the basis of the described embodiment, as a further preference, the wall thickness of the cuboid-shaped block I 31 located at two sides of the snap-fit fastener II 312 is greater than the wall thickness of the other two sides, which not only facilitates the snap-fit fastener I 521 to be snap-fitted with the snap-fit window I 311, but also facilitates the snap-fit fastener II 312 to be snap-fitted with the outer frame sleeve 2, and also ensures the stability of the expanded side wall.

The length and width of the snap-fit window I 311 are respectively set as 2.5 cm and 1.4 cm, and the width of the U-shaped opening 313 is set as 0.60 cm. This not only ensures that the snap-fit fastener I 521 and the snap-fit window I 311 can be snap-fitted stably, but also ensures that the side wall of the cuboid-shaped block I 31 does not need to be greatly expanded when the snap-fit fastener I 521 and the s snap-fit window I 311 are snap-fitted, thereby satisfying the requirement for the side wall to be expanded. Therefore, the width of the U-shaped opening 313 is set to be 0.60 cm, and the side wall of the cuboid-shaped block I 31 is prevented from being broken due to insufficient strength of the side wall of the cuboid-shaped block I 31 because the width of the U-shaped opening 313 is too large.

On the basis of the above embodiment, as a further preference, a wedge-shaped groove 315 is provided at an upper part of the cuboid-shaped block I 31 on one side of the snap-fit fastener II 312, so as to provide a kneading space for the snap connection between the s snap-fit fastener II 312 and the outer frame sleeve 2, and a certain distance exists between the bottom of the wedge-shaped groove 315 and the other side edge of the cuboid-shaped block I 31 to form a reinforcing rib 316 to reinforce the strength of the cuboid-shaped block I 31.

On the basis of the described embodiment, as a further preference, the press-inserting core tail shank 8 is provided with a cuboid III 81, a cylinder IV 82 concentrically stacked and fixedly connected to the lower end of the cuboid III 81, and a cylinder V 83 concentrically stacked and fixedly connected to the lower end of the cylinder IV 82, a cylindrical hole II 84 is provided at the center of the cylinder V 83, a cylindrical hole III 85 overlapped and connected to the upper end of the cylindrical hole II 84 and penetrating through the cylinder IV 82, and a cylindrical hole IV 86 is provided at the center of the cuboid III 81, wherein the cylindrical hole II 84, the cylindrical hole III 85 and the cylindrical hole IV 86 are concentric with the cuboid III 81, the cylinder IV 82 and the cylinder V 83, and the cylindrical hole III 85 is in communication with the cylindrical hole IV 86, and the bottom opening of the cylindrical hole II 84 is provided with a chamfer I 87, a chamfer II 88 is provided between the cylindrical hole II 84 and the cylindrical hole III 85, a chamfer IV 89 is provided between the cylindrical hole III 85 and the cylindrical hole IV 86, the metal ring 10 is defined in the cuboid III 81, the cuboid III 81 is arranged in the square hole 32, and the top of the cuboid III 81 abuts against the bottom of the annular flange structure 34, the cylinder V 83 extends out of the square hole 32 and extends into the through hole I 71 of the stop ring 7 at a certain distance, a distance is between the bottom of the cuboid III 81 and the top of the second step 56, and the spring 9 is defined between the bottom of the cuboid III 81 and the top surface of the cylinder I 72 and the second step 56.

The cuboid III 81 is defined in the square hole 32. Because both are of a quadrangular structure, a movable space of the cuboid III 81 in the square hole 32 is small, and the cuboid III 81 can be stably defined in the square hole 32, so that data transmission is more stable. The top surface of the cylinder I 72 and the second step 56 are flush with each other to provide a relatively wide pop-up plane for the spring 9. The spring 9 is defined in the square hole 32 and elastically moves between the bottom of the cuboid-shaped block I 31 and the top surface of the cylinder I 72 and the second step 56, thereby ensuring stability when the inserting core 11 is connected to the docking connector. By arranging the cylinder IV 82 between the cuboid III 81 and the cylinder IV 82, the strength of the f press-inserting core tail shank 8 is increased without affecting the elastic pressing work of the spring 9.

A core inserting hole 111 is provided at the center of the inserting core 11, a chamfer V 112 is provided at the lower end of the core inserting hole 111. After the inserting core 11 is inserted into the metal ring 10, the chamfer V 112 is aligned with the chamfer IV 89. When the optical fiber core enters cylindrical hole II 84 from tail pipe 6 through stop ring 7 and then passes through cylindrical hole III 85, the setting of chamfer I 87 facilitates the entrance of the optical cable core from the through hole I 71 of the stop ring 7 into the cylindrical hole II 84 and the optical cable core enters the core inserting hole 111 after passing through the chamfer IV 89 and the chamfer V 112 and extends out of the core inserting hole. The setting of the chamfer II 88 facilitates the optical cable core to enter the cylindrical hole III 85 from the cylindrical hole II 84, and after the optical cable core is inserted into the press-inserting core tail shank 8 and the inserting core 11, glue dispensing is performed to bond the optical cable core to the press-inserting core tail shank 8 and the inserting core 11, The diameter of the cylindrical hole II 84 is greater than the design of the cylindrical hole III 85 and the chamfer I 87, so that it is convenient for a dispensing needle to enter the cylindrical hole III 85 through the chamfer II 88 for dispensing. The chamfer V 112 and the chamfer IV 89 are designed to facilitate entry of glue, and the glue bonds the metal ring 10, the inserting core 11, the press-inserting core tail shank 8, and the optical cable core together. After the glue is air-dried, the portion of the inserting core hole 111 at the extension position of the optical cable core is cut to be flush with the top of the inserting core 11.

The cylinder V 53 is designed to extend out of the square hole 32 into the through hole 71 of the stop ring 7 at a certain distance. When dispensing glue, a glue dispensing needle enters the cylindrical hole III 85 from the cylindrical hole III 84 for dispensing glue, and the height of the cylindrical hole III 84 can prevent the glue from flowing back. Compared with the prior art, in order to facilitate glue dispensing of a needle and prevent the glue from not flowing back, a transparent pipe needs to be added at the tail of the press-inserting core tail shank 8. The present application not only saves one part, but also saves installation steps and saves costs.

On the basis of the foregoing embodiment, as a further preference, the metal ring 10 is provided with an inner hole II 101, an outer wall of the metal ring 10 is provided with a protruding annular limiting groove II 102, and the metal ring 10 is fixedly connected in a cylindrical hole IV 86 of the cuboid III 81 by means of injection molding. The top of the metal ring 10 is flush with the top of the cuboid III 81, and the inner wall of the cylindrical hole IV 86 is provided with an annular limiting protrusion II 861 corresponding to the annular limiting groove II 102. The inner hole II 101 of the metal ring 10 is concentrically aligned with the cylindrical hole III 85 and the inner hole I 341, and the inserting core 11 passes through the cylindrical hole I 33 and the inner hole I 341 to enter the inner hole II 101. The cylindrical hole II 84, the cylindrical hole III 85, and the inserting core hole 111 are on a same straight line, so that the optical cable core stretches into the inserting core 11 from the press-inserting core tail shank 8.

The circular limiting protrusion II 861 and the circular limiting groove II 102 are mutually engaged, so that the metal ring 10 and the press-inserting core tail shank 8 are fixed more stably after injection molding. After the inserting core 11 enters the inner hole II 101, the bottom of the inserting core 11 is located at the upper side of the bottom of the cylindrical hole IV 86, and the relative position where the inserting core 11 enters the metal ring 10 is defined.

The present application has a simple structure and fewer parts, is convenient for automated assembly, and has a stable data connection and a low cost.

The above are only preferred embodiments of the present application. It should be noted that, a person skilled in the art may make further improvements and modifications without departing from the principle of the present application, and these improvements and modifications shall also belong to the scope of protection of the present application.

What is claimed is:

1. An easy-to-assemble SC connector, comprising a tail sleeve, an outer frame sleeve, a fixing piece fixed to the outer frame sleeve, a limiting piece snap-fitted with the fixing piece, a tail pipe sleeved in the tail sleeve, a stop ring fixedly connected to the limiting piece, a press-inserting core tail shank which is arranged in the fixing piece and the tail thereof extends to the inside of the stop ring, a spring defined between the press-inserting core tail shank and the stop ring, and a metal ring fixed in the press-inserting core tail shank, a ceramic inserting core fixedly sleeved in the metal ring in an interference fit, and the press-inserting core tail shank is configured to abut against the stop ring via the spring.

2. An easy-to-assemble SC connector as claimed in claim 1, wherein the material used for the press-inserting core tail shank is plastic that can be molded by means of injection molding, and the limiting piece is fixedly connected to the stop ring by means of injection molding, and the metal ring is fixedly connected to the press-inserting core tail shank by means of injection molding.

3. An easy-to-assemble SC connector head as claimed in claim 1, wherein the limiting piece comprises a first square block and a second square block which is fixedly connected to an upper end of the first square block in an overlapping manner, wherein a first circular hole penetrating through the first square block and extending into the middle of the second square block, and a second circular hole concentric with the first circular hole and connected to the top thereof are provided at the center of the limiting piece; the first square block is concentric with the second square block, and the first square block is larger than the second square block, a first step is formed on the outer sides of the first square block and the second square block, and after the fixing piece and the second square block are buckled, the bottom of the fixing piece is located on the upper side of the first step, the outer side of the first square block is provided with a process notch, and the outer side of the second square block is further provided with a snap-fit fastener I for snap-fit the fixing piece, the diameter of the second circular hole is greater than the diameter of the first circular hole, and a second step is formed at the junction of the first circular hole and the second circular hole, the inner wall of the first circular hole is provided with a plurality of protruding annular limiting projections I arranged at intervals.

4. An easy-to-assemble SC connector as claimed in claim 3, wherein the stop ring is provided with a cylinder I with a through hole I in the center, the outer wall of the cylinder I is provided with annular limiting grooves I and annular protruding rings III arranged at equal intervals, an upper portion of the cylinder I enters the first circular hole and a top surface of the cylinder I is flush with the second step, the annular limiting groove I of the part of the outer wall of the cylinder I entering the first circular hole corresponds to the annular limiting protrusion I, a lower part of the cylinder I extends into the tail pipe and is fixedly connected to the tail pipe in an interference fit.

5. An easy-to-assemble SC connector as claimed in claim 4, wherein the fixing piece is provided with a cuboid-shaped block I, two sides of the cuboid-shaped block I are provided with a snap-fit window I corresponding to the first snap-fit fastener I, and a snap-fit fastener II snap-fitted with the outer frame sleeve, U-shaped openings in communication with the bottom are provided on the other two sides of the cuboid-shaped block I, and a square hole is provided at one end of the cuboid-shaped block I close to the U-shaped opening, the other end of the cuboid shaped block I is provided with a cylindrical bole I in communication with the square hole, and an annular flange structure protruding towards the center is provided between the cylindrical hole I and the square hole, the annular flange structure is provided with an inner hole I in communication with the cylindrical hole I and the square hole, and the length of the snap-fit window I is less than twice the width, the width of the U-shaped opening is less than half of the width of the first button window.

6. An easy-to-assemble SC connector as claimed in claim 5, wherein the wall thickness of the cuboid-shaped block I located at two sides of the snap-fit fastener II is greater than the wall thickness of the other two sides, the length and width of the snap-fit window I are respectively set to 2.5 cm and 1.4 cm, and the width of the opening of the U-shaped opening is set to less than 0.80 cm.

7. An easy-to-assemble SC connector as claimed in claim 5, wherein a wedge-shaped groove is provided at the upper part of the cuboid-shaped block I on one side of the snap-fit fastener II, and the bottom of the wedge-shaped groove is at a certain distance from the other side edge of the cuboid-shaped block I to form a reinforcing rib.

8. An easy-to-assemble SC connector as claimed in claim 5, wherein the press-inserting core tail shank is provided with a cuboid III, a cylinder IV concentrically stacked and fixedly connected to the lower end of the cuboid III, and a cylinder V concentrically stacked and fixedly connected to the lower end of the cylinder IV, a cylindrical hole II is provided at the center of the cylinder V, a cylindrical hole III overlapped and connected to the upper end of the cylindrical hole II and penetrating through the cylinder IV, and a cylindrical hole IV is provided at the center of the cuboid III, wherein the cylindrical hole II, the cylindrical hole III and the cylindrical hole IV are concentric with the cuboid III, the cylinder IV and the cylinder V, and the cylindrical hole III is in communication with the cylindrical hole IV, and the bottom opening of the cylindrical hole II is provided with a chamfer I, a chamfer II is provided between the cylindrical hole II and the cylindrical hole III, a chamfer IV is provided between the cylindrical hole III and the cylindrical hole IV, the metal ring is defined in the cuboid III, the cuboid III is arranged in the square hole, and the top of the cuboid III abuts against the bottom of the annular flange structure, the cylinder V extends out of the square hole and extends into the through hole I of the stop ring at a certain distance, a distance is between the bottom of the cuboid III and the top of the second step, and the spring is defined between the bottom of the cuboid III and the top surface of the cylinder I and the second step.

9. An easy-to-assemble SC connector as claimed in claim 8, wherein the metal ring is provided with an inner hole II, an outer wall of the metal ring is provided with a protruding annular limiting groove II, and the metal ring is fixedly connected in a cylindrical hole IV of the cuboid III by means of injection molding, the top of the metal ring is flush with the top of the cuboid III, an inner wall of the cylindrical hole IV is provided with an annular limiting projection II corresponding to the annular limiting groove II, the inner hole II of the metal ring is concentrically aligned with the cylindrical hole III and the inner hole I, and the inserting core passes through the cylindrical hole I and the inner hole I to enter the inner hole II.

* * * * *